Aug. 14, 1945.   J. INGALLS   2,382,060
COLLET WITH REMOVABLE PADS
Filed Oct. 15, 1942
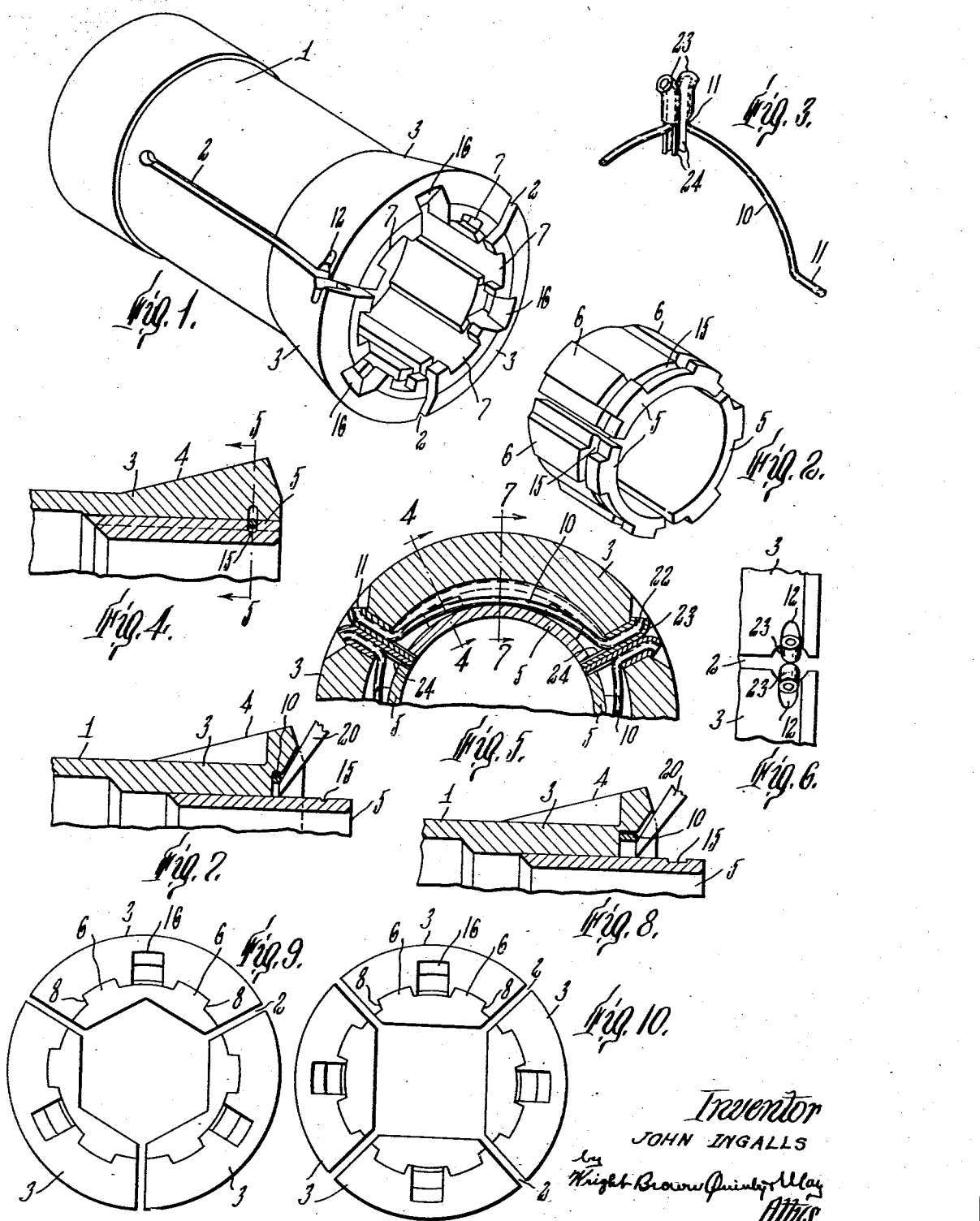
Inventor
JOHN INGALLS Patented Aug. 14, 1945

2,382,060

UNITED STATES PATENT OFFICE 2,382,060

COLLET WITH REMOVABLE PADS

John Ingalls, Windsor, Vt., assignor to Cone Automatic Machine Company, Inc., Windsor, Vt., a corporation of Vermont Application October 15, 1942, Serial No. 462,197

5 Claims. (Cl. 279—51)

This invention relates to collets such as are employed for clamping or feeding lengths of stock, and has for an object to provide readily removable and replaceable stock engaging pads.

One object of the present invention is to provide means for releasably securing the pads in position, such means being always retained by the collet so that they are not liable to become detached.

A further object is to provide pads which are interchangeable with respect to the jaws of the collet so that any pad of a set may be assembled with any jaw of the collet.

A further object is to provide means for preventing the entry of chips and other foreign matter between the jaws and the pads and past the fastening means into the interior of the work spindle.

Further objects and advantages will appear from a more complete description of certain embodiments of the invention shown in the accompanying drawing, in which Figure 1 is a perspective view of a work clamping collet embodying the invention, the pads being omitted.

Figure 2 is a perspective view of a set of pads for the collet of Figure 1.

Figure 3 is a fragmentary perspective view of the pad-retaining means for an adjacent pair of pads.

Figure 4 is a detail sectional view on line 4—4 of Figure 5 showing a pad in position with respect to a collet jaw.

Figure 5 is a detail sectional view on line 5—5 of Figure 4.

Figure 6 is a fragmentary side elevation showing adjacent collet jaw edges and pad-retaining spring ends.

Figure 7 is a detail sectional view on line 7—7 of Figure 5 showing the manner in which a collet pad may be released for removal.

Figure 8 is a view similar to Figure 7, but showing a modification.

Figures 9 and 10 are front elevations of the collet and pads and showing different interior configurations of the pads.

Referring to the drawing, at 1 is indicated a spring collet which is slit inwardly from its outer end, as by the kerfs 2, to form a plurality of spring jaws 3. Three such jaws are shown, although more might be employed if desired. As is usual with collets of this type, each of the jaws is provided adjacent to its free end with an outwardly flaring or tapered outer face 4 for engagement with a mating face on a work spindle, so that when the collet is drawn backwardly the jaws are sprung inwardly so that their inner faces, or in this case, separate pads carried thereby, are brought into gripping relation with the work, while relative motion of the collet in the opposite direction permits the jaws to spring outwardly and release the work.

A set of work-engaging pads 5 for the collet shown in Figure 1 is illustrated in Figure 2. The pads and collets are provided with mating ribs and grooves extending substantially parallel to the axis of the collet, and as shown, the pads are provided with such ribs 6 which may engage in grooves 7 of the collet jaws. As these ribs 6 are arranged radially, it will be noted from an inspection of Figures 9 and 10 that their outer edges 8 flare so that the engagement of these ribs in the grooves 7 act to retain the pads outwardly against the inner faces of the collet jaws and they also serve to locate the pads angularly with respect to their respective jaws. In order to secure the pads in position, therefore, it is only necessary to provide means for holding the pads in proper lengthwise position with respect to the collet jaws. Releasable means for doing this has been provided, such means comprising the leaf springs 10, end portions of which at 11 are outwardly turned and retained in recesses 12 in opposite edges of each of the jaws, while a portion intermediate to the ends of the spring may engage in a peripheral groove 15 in the corresponding pad. The normal curvature of the springs 10 is flatter than the corresponding interior face of the collet jaw, as illustrated best in Figure 5 in full lines, so that this central portion normally engages in the slot 15 of the pad when it is in position on the inner face of the jaw, but it can be pried outwardly from the groove 15 and above the adjacent portions of the rib 6 through which it passes by a suitable tool such as a screw driver which may be inserted between it and the outer face of the pad, as through a recess 16 in the forward face of each of the collet jaws located between the grooves 7. By the use of such a tool, as is shown at 20 in Figures 7 and 8, the intermediate portion of the spring 11 may be pried upwardly into the dotted line position of Figure 5 and in the full line positions of Figures 7 and 8, thus to permit the corresponding pad to be moved axially out from its locked position forwardly out from the front end of the collet. The rear ends of the ribs 6 are beveled, as shown best in Figure 4, so that when the pads are inserted and pushed rearwardly these beveled ends pry the springs 11 outwardly and allow easy insertion of the pads.

In order that the end portions of the springs 11 may be held firmly to the collet jaws, but with freedom for the intermediate portions of the spring to be deflected out of locking position, they are shown as hooked at their extremities as at 22, and in order that chips and other foreign matter may not be able to enter into the collet through the slots between the collet jaws and the pads, these spring ends may be covered with tubular guards, such as 23, which may be of resilient material resistant to oil, such as the synthetic rubber compounds commercially available for the purpose. Inwardly of the springs these guards 23 may be extended inwardly for portions of their circumferences as at 24 to extend in between the pads so as to fill the spaces between them as well as to fill the spaces between the edges of the collet jaws and in the recesses 12. These guards or packing members 23 are sufficiently yieldable to permit the necessary motion of the collet jaws from and toward each other in order to perform their desired functions.

As shown in Figure 2, the pads together define a cylindrical opening for the work, but they may be otherwise contoured as shown, for example, in Figure 9, where the interior contour is hexagonal, and in Figure 10, where the interior contour is square, the particular configuration chosen being dependent upon the cross sectional configuration of the stock which is to be handled by the collet. The use of the removable pads makes it possible to employ the same collet for various diameters and cross sectional configurations of stock by the choice of pads correspondingly sized and contoured. As shown in Figures 3 and 7, the spring 10 is round in cross section, but it may be otherwise formed as, for example, in Figure 8 where it shown as flat.

While as shown the invention is applied to a work gripping collet, it can also be applied to a stock pusher in which the collet jaws are always in resilient engagement with the work instead of normally springing away therefrom as in the gripping collet.

From the foregoing description of certain embodiments of this invention it should be evident to those skilled in the art that various other modifications and changes might be made without departing from the spirit or scope of this invention.

I claim:

1. In combination with a collet having a plurality of jaws, of a removable pad for each jaw, each pad having on its outer face radially arranged longitudinally disposed ribs and the jaws having grooves to receive said ribs and thereby hold said pads outwardly against the inner faces of said jaws, each of said pads having a circumferential groove in its outer face, and the corresponding jaw having a leaf spring provided with a portion intermediate to its ends engageable in the groove of the corresponding pad for retaining said pad in assembled relation with said jaw.

2. In combination with a collet having a plurality of jaws, of a removable pad for each jaw, each pad having on its outer face radially arranged longitudinally disposed ribs and the jaws having grooves to receive said ribs and thereby hold said pads outwardly against the inner faces of said jaws, each of said pads having a circumferential groove in its outer face, and the corresponding jaw having a leaf spring provided with a portion intermediate to its ends engageable in the groove of the corresponding pad for retaining said pad in assembled relation with said jaw, said jaws having opposed recesses into which the ends of said springs are engaged.

3. In combination with a collet having a plurality of jaws, of a removable pad for each jaw, each pad having on its outer face radially arranged longitudinally disposed ribs and the jaws having grooves to receive said ribs and thereby hold said pads outwardly against the inner faces of said jaws, each of said pads having a circumferential groove in its outer face, and the corresponding jaw having a leaf spring provided with a portion intermediate to its ends engageable in the groove of the corresponding pad for retaining said pad in assembled relation with said jaw, said jaws having opposed recesses into which the ends of said springs are engaged and having recesses in their forward ends exposing the intermediate portions of said springs to access by a tool by which said springs may be pried outwardly to release said pads for removal from said jaws.

4. In combination with a collet having a plurality of jaws, of a removable pad for each jaw, each pad having on its outer face radially arranged longitudinally disposed ribs and the jaws having grooves to receive said ribs and thereby hold said pads outwardly against the inner faces of said jaws, each of said pads having a circumferential groove in its outer face, and the corresponding jaw having a leaf spring provided with a portion intermediate to its ends engageable in the groove of the corresponding pad for retaining said pad in assembled relation with said jaw, said jaws having opposed recesses into which the ends of said springs are engaged, said spring ends being provided with tubular cushioning elements having portions extending between adjacent pads and serving as packings against the passage of chips and other foreign matter into the interior of the collet.

5. In combination with a collet having a plurality of jaws, of a removable pad for each jaw, each pad having on its outer face radially arranged longitudinally disposed ribs and the jaws having grooves to receive said ribs and thereby hold said pads outwardly against the inner faces of said jaws, each of said pads having a circumferential groove in its outer face, and the corresponding jaw having a leaf spring provided with a portion intermediate to its ends engageable in the groove of the corresponding pad for retaining said pad in assembled relation with said jaw, said jaws having opposed recesses into which the ends of said springs are engaged and having their rear ends beveled to engage and pry said springs outwardly to facilitate assembly of said pads with said jaws.

JOHN INGALLS.